A. J. Grush,
Cultivator.
No. 96,801.   Patented Nov. 16, 1869.
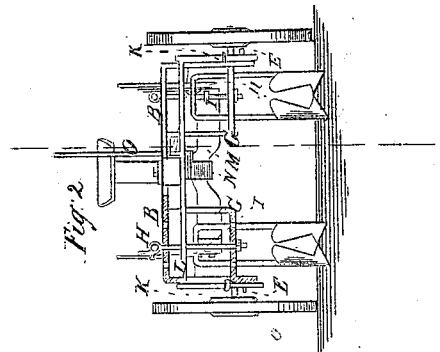
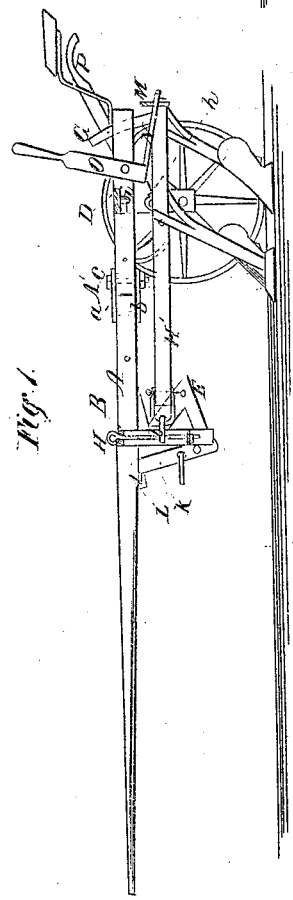
Witnesses:
Jno. H. Brooks
Edgar Tate
Inventor:
A. J. Grush
per Munn & Co.
Attorneys.

UNITED STATES PATENT OFFICE.

A. J. GRUSH, OF SPRINGFIELD, ILLINOIS.

IMPROVEMENT IN CORN-CULTIVATORS.

Specification forming part of Letters Patent No. 96,801, dated November 16, 1869.

*To all whom it may concern:*

Be it known that I, A. J. GRUSH, of Springfield, in the county of Sangamon and State of Illinois, have invented a new and useful Improvement in Corn-Cultivators; and I do hereby declare that the following is a full, clear, and exact description thereof, which will enable those skilled in the art to make and use the same, reference being had to the accompanying drawings, forming part of this specification.

The object of this invention is to provide a cultivator capable by a slight adjustment of adaptation for use and for guidance, either for the operator to ride upon it or walk behind it.

It is also designed to provide certain adjusting devices for the plow-beams for governing the depth of plowing and their distance apart; also, an adjustable arrangement for the plow-handles, and an arrangement of means for suspending the plows above the ground.

Figure 1 represents a longitudinal sectional elevation of my improved machine; and Fig. 2 represents a front view of the same, partly sectioned.

The tongue or beam A is made in two parts, joined at A' by plates *a* and *b* and bolts *c*, adapted for ready application or removal. Each part of the said beam is provided with an axle or transverse bar for connecting the wheels, B being the one for the front part, and D the one for the rear part, both having vertical arms at the ends.

When the operator desires to ride, the rear part is attached and the wheels placed on the journals thereof, and when he walks behind this part is detached and the wheels are placed on the axle-arms E of the front axle, which are supported in rear extensions, F, thereof. The said front beam or axle is provided with frames or yokes G, for the support of screw-bolts H, to which the plow-beams are connected by links I, which may be screwed up or down on the said bolts for ranging the depth of the plowing. These yokes or frames have several holes at varying distances from the center for changing the said bolts to or from the said center for varying the distances of the plows apart. The said beams are also provided with forward-projecting draft-bars K, also adapted for varying the draft by hitching to higher or lower holes thereon. The said draft-bars are supported laterally by a transverse bar, L, fastened to the under side of the tongue. The rear ends of the plow-beam are connected by a bar, M, under which at the center the arm N of a lever, O, ranges, so as to raise the plows off the ground, when the riding attachment is connected for transporting them from place to place, for lifting over stones, stumps, or other obstructions.

The handles P of the plows are made adjustable along circular braces Q, to which they are connected by pins. The said handles are pivoted at the lower ends to the plows to permit of this adjustment.

The plow-beams are provided with staples *h*, and the beams D with hooks *i*, by which the said plows may be held above the ground after being raised by the lever O and arm N.

Having thus described my invention, I claim as new and desire to secure by Letters Patent—

1. The tongue or beam A, made in two parts, connected by a detachable joint, A', and provided with the axles B D, substantially as specified.

2. The combination, with the plow-beams H' and the tongue or beam A, of the bar M and lever O.

A. J. GRUSH.

Witnesses:
 THOS. A. PRITCHETT,
 JOHN LACY.